Dec. 20, 1949  J. P. McCREADY  2,491,571
PARTING TOOL HOLDER FOR LATHES
Filed Oct. 8, 1948

INVENTOR.
James P. McCready
BY
Pennie, Edmonds, Morton and Barrows
ATTORNEYS

Patented Dec. 20, 1949

2,491,571

UNITED STATES PATENT OFFICE 2,491,571

PARTING TOOLHOLDER FOR LATHES

James P. McCready, New York, N. Y.

Application October 8, 1948, Serial No. 53,418

5 Claims. (Cl. 164—36)

This invention relates to parting tools for metal working lathes and particularly to a device adapted to be mounted on the tool post of a lathe affording a support for the workpiece and means for holding and feeding the tool to the workpiece.

In the customary arrangement of metal working lathes, the workpiece is supported by centers in the head and tail stocks and the tool is held in a tool holder which is in turn mounted on the tool post supported by the carriage. When the tool is used for parting, i. e., cutting off the workpiece, it is subject to vibration and chattering, and the tool is often deflected downwardly below the center of the workpiece to an extent which may result in breakage of the tool. Such deflection is referred to generally as "bite." If the tool is not broken, the lathe must be stopped while the tool is readjusted.

It is the object of the present invention to provide a simple and effective attachment for metal working lathes which avoids the difficulties mentioned and which also supports a workpiece so that the tail stock center is not required. The elimination of the tail stock center enables the operator to handle longer pieces which cannot be suspended between the head and tail stock centers of the lathe, for example shafting which is longer than the distance between the centers.

Other objects and advantages of the invention will be apparent as it is better understood by reference to the following specification and the accompanying drawing; in which Fig. 1 is a side elevation of the device;

Figure 1:
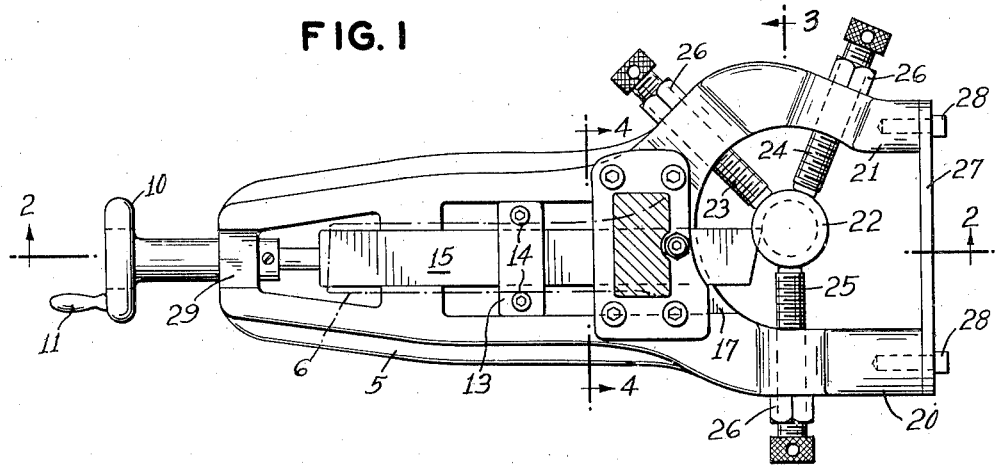
Figure 2:
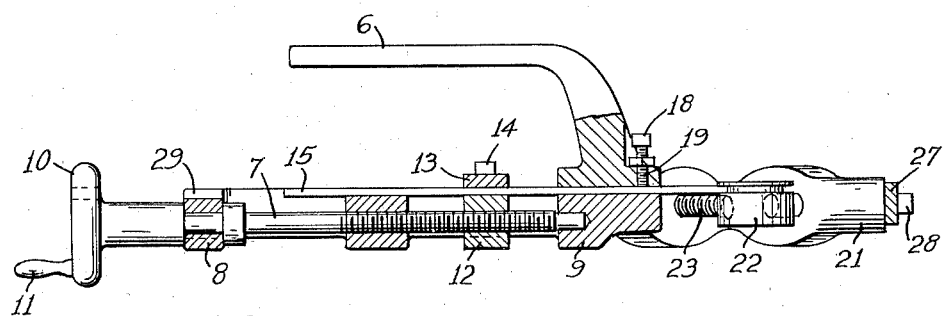
Fig. 2 is a horizontal section on the line 2—2 of Fig. 1.
Figure 3:
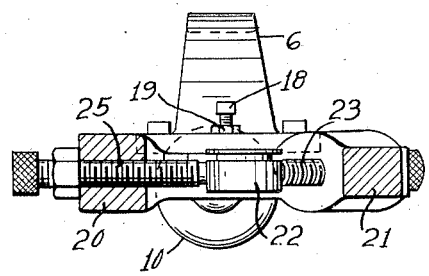
Fig. 3 is a vertical section on the line 3—3 of Fig. 1.
Figure 5:
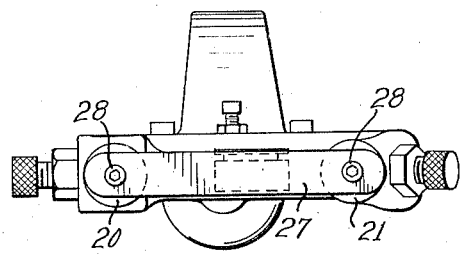
Fig. 5 is an end elevation of the structure shown in Fig. 1.
Figure 4:
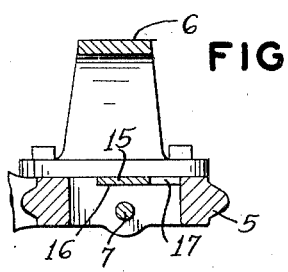
Fig. 4 is a vertical section on the line 4—4 of Fig. 1.

The details of a typical metal working lathe are not illustrated in the drawing, since they form no part of the invention and are a matter of common knowledge. It will be understood that the lathe is provided with the usual head stock and with the saddle, compound rest and tool post. The tail stock may be removed from the lathe, if necessary, if the workpiece is longer than the distance between centers, since it is not utilized in connection with the device hereinafter described.

Referring to the drawing, 5 indicates a metal frame of any suitable construction, having an arm 6 secured at one side thereof and of rectangular shape so that the end thereof may be inserted in the rectangular tool holder slot which is normally provided in the tool post. Thus the device may be clamped securely to the tool post in proper position to present the tool to the workpiece. A threaded shaft 7 is mounted in bearings 8 and 9 in the frame 5 extending longitudinally thereof and is provided at its end with a hand wheel 10 having a handle 11 so that the shaft may be turned in its bearings.

A block 12 is threadedly engaged with the shaft 7 and is movable longitudinally thereof when the shaft is rotated. The block 12 carries a clamping bar 13 which is adapted to be held by bolts 14 and thereby to clamp the tool 15 securely so that the tool is movable with the block 12. The tool 15 extends through a guideway 16 in the frame through which the tool is advanced as necessary toward the workpiece. A shim 17 is adapted to be introduced beneath the tool to support it in the guideway. Shims of different sizes are provided so that tools of different widths may be firmly supported in the device during operation thereof. A bolt 18 with a lock nut 19 extends partially through the frame to engage the tool 15 to limit lateral movement thereof and thus to ensure rigidity of the tool as it engages the workpiece.

The frame 5 is provided with projecting arms 20 and 21 which are adapted to pass around the workpiece 22. The latter is supported in the usual manner at the head stock. In order to support the workpiece 22 adjacent the tool 15, bolts 23 and 24 pass through the arm 21, and a similar bolt 25 passes through the arm 20. The ends of the bolts are adapted to engage the surface of the workpiece 22 and hold it firmly in centered position while the workpiece rotates under the driving action of the head stock. Lock nuts 26 are provided on the bolts 23, 24 and 25 so that they can be secured in adjusted position. A bar 27 is secured to the ends of the arms 20 and 21 by means of bolts 28. The bar 27 is removable to permit the arms 20 and 21 to pass about the workpiece when for any reason it is not convenient to merely pass the workpiece through the opening between the arms.

The frame 5 is provided preferably with a recess 29 in line with the tool 15, and the hand wheel 10 may be squared so that by loosening the clamp 13 the tool 15 can be withdrawn lengthwise from its support without completely removing the clamping bar 13. A new tool may be inserted similarly.

In using the invention, the arm 6 is mounted in the tool post and secured. The workpiece is then supported in the head stock by means of the usual chuck or by the use of a lathe dog. The tools 23, 24 and 25 are then adjusted to center the workpiece. Thereupon, by adjustment of the hand wheel 10 the tool 15 can be adjusted to the workpiece so that when the lathe is started the cutting is commenced. Thereafter the tool 15 may be advanced as necessary until the cutting operation is completed.

The apparatus as described avoids the difficulties heretofore met frequently in the execution of parting operations in metal working lathes. It facilitates such operations and generally ensures more satisfactory work with reduced possibility of error in the execution of the work.

Various changes may be made in the structure and mode of operation as described without departing from the invention or sacrificing the advantages thereof.

I claim:

1. In a tool holding device for metal working lathes, the combination of a frame having two opposed arms, means carried by the arms to engage and center a workpiece, a tool clamp slidably mounted in the frame, means for shifting the tool clamp longitudinally of the frame, and a rigid supporting arm secured to the frame, said supporting arm being spaced laterally from the frame and extending substantially parallel to the longitudinal direction of the frame and having a portion of rectangular shape to correspond to the shape of the slot of a tool post of a lathe, so that the supporting arm may be secured in such a tool post and the tool holding device thereby supported on a lathe, the frame having a recess aligned with the tool clamp at the end of the frame.

2. In a tool holding device for metal working lathes, the combination of a frame having a rigid supporting arm spaced laterally therefrom and two opposed arms at one end, said supporting arm extending substantially parallel to the longitudinal direction of the frame and having a portion of rectangular shape to correspond to the shape of the slot of a tool post of a lathe, so that the supporting arm may be secured in such a tool post and the tool holding device thereby supported on a lathe, means carried by the opposed arms to engage and center a workpiece, a tool clamp slidably mounted in the frame and means for shifting the tool clamp longitudinally of the frame.

3. In a tool holding device for metal working lathes, the combination of a frame having a rigid supporting arm spaced laterally therefrom and two opposed arms at one end, said supporting arm extending substantially parallel to the longitudinal direction of the frame and having a portion of rectangular shape to correspond to the shape of the slot of a tool post of a lathe, so that the supporting arm may be secured in such a tool post and the tool holding device thereby supported on a lathe, means carried by the opposed arms to engage and center a workpiece, a tool clamp slidably mounted in the frame, means for shifting the tool clamp longitudinally of the frame, and a removable bar secured to the ends of the opposed arms.

4. In a tool holding device for metal working lathes, the combination of a frame having a rigid supporting arm spaced laterally therefrom and two opposed arms at one end, said supporting arm extending substantially parallel to the longitudinal direction of the frame and having a portion of rectangular shape to correspond to the shape of the slot of a tool post of a lathe, so that the supporting arm may be secured in such a tool post and the tool holding device thereby supported on a lathe, means carried by the opposed arms to engage and center a workpiece, a tool clamp slidably mounted in the frame, and means for shifting the tool clamp longitudinally of the frame, the frame having a guideway and a removable shim in the guideway.

5. In a tool holding device for metal working lathes, the combination of a frame having a rigid supporting arm spaced laterally therefrom and two opposed arms at one end, said supporting arm extending substantially parallel to the longitudinal direction of the frame and having a portion of rectangular shape to correspond to the shape of the slot of a tool post of a lathe, so that the supporting arm may be secured in such a tool post and the tool holding device thereby supported on a lathe, adjustable means carried by the opposed arms providing a three-point support for the workpiece, a tool clamp slidably mounted in the frame, and means for shifting the tool clamp longitudinally of the frame.

JAMES P. McCREADY.

REFERENCES CITED

The following references are of record in the file of this patent:

UNITED STATES PATENTS

| Number | Name | Date |
|---|---|---|
| 245,668 | Smith | Aug. 16, 1881 |
| 944,630 | McCullough | Dec. 28, 1909 |
| 1,405,784 | Hufstedler | Feb. 7, 1922 |
| 1,675,386 | Schultheiss | July 3, 1928 |
| 2,420,945 | Gaylord | May 20, 1947 |